United States Patent [19]

Graff

[11] 3,925,462

[45] Dec. 9, 1975

[54] WASH-DURABLE ANTISTATIC AGENT
[75] Inventor: Kenneth W. Graff, Hockessin, Del.
[73] Assignee: ICI United States Inc., Wilmington, Del.
[22] Filed: Dec. 29, 1972
[21] Appl. No.: 319,745

[52] U.S. Cl.............. 260/471 C; 8/115.5; 8/116.2; 8/129
[51] Int. Cl.² ................................. C07C 125/06
[58] Field of Search ........ 260/479 C, 471 C, 473 R

[56] References Cited
UNITED STATES PATENTS
3,658,717  4/1972  Graff................................. 252/355
3,738,981  6/1973  Graff et al. ...................... 260/239.3

Primary Examiner—James A. Patten

[57] ABSTRACT

Disclosed are textile treating compositions comprising a novel class of carbamic acid esters containing at least one thermally labile carbamic acid ester group and containing at least one thermally stable carbamic acid ester group derived from a cationic surfactant represented by the generalized formula

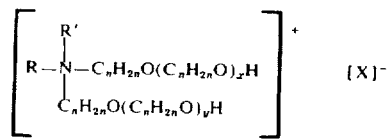

wherein $n$ represents an integer from 2 to 4, $x$ represents a number from 0 to 100, $y$ represents a number from 0 to 100, R represents a radical selected from the group consisting of alkyl and alkenyl radicals containing from 6 to 22 carbon atoms, R' represents a radical selected from the group consisting of alkyl and hydroxyalkyl radicals containing from 1 to 5 carbon atoms, and X represents an anion.

7 Claims, No Drawings

WASH-DURABLE ANTISTATIC AGENT

The present invention relates to textile treating compositions, to methods of treating textiles and to the textiles having improved physical properties. More particularly, the present invention relates to novel carbamic acid esters which are useful for treating textile materials to impart antistatic properties.

The commercial importance of synthetic fibers in the textile industry has greatly emphasized the importance of antistatic agents and finishes since most synthetic fibers, for example, those derived from polyesters, acrylics, polyamides, and vinyls, are notorious static electricity generators.

It has been suggested that the extent to which a fabric can get soiled depends in part upon the electrostatic charge of the fibers. The higher the electrostatic charge on the fibers, the more is the soiling. Therefore, it is considered that the subject antistatic agents contribute directly to imparting antisoiling characteristics to textile materials.

It is an object of the present invention to provide novel textile treating compositions for application to textile materials to impart thereto antistatic characteristics.

It is another object of the present invention for treating textile material in such a manner that it has a high antistatic characteristic imparted thereto.

These and other objects of the present invention are accomplished by providing a novel class of carbamic acid esters containing at least one thermally labile carbamic acid ester group and containing at least one thermally stable carbamic acid ester group derived from a cationic surfactant as defined below.

The novel carbamic acid esters of the present invention may be prepared by reacting, simultaneously or consecutively in any order, an aromatic polyisocyanate, a cationic surfactant as defined below, and a thermally reversible blocking agent, such as phenol, methylphenol, dimethylphenol, trimethylphenol, ethylphenol, and mixtures thereof. Thus, the polyisocyanate may be reacted with the blocking agent in such proportion that 1-NCO group remains and may subsequently be reacted with the cationic surfactant. Alternatively, it is possible to conduct the reaction in reverse order so that the polyisocyanate is first reacted with the cationic surfactant compound and afterwards with the blocking agent. It is also possible to perform the reaction by mixing all of the reactants in suitable proportions so that the reactions proceed simultaneously.

By the term "cationic surfactant" as used hereinabove and hereinafter in the present specification is intended cationic surfactants represented by the general formula

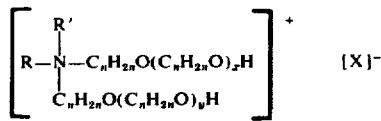

wherein $n$ represents an integer from 2 to 4, $x$ represents a number from 0 to 100, $y$ represents a number from 0 to 100, R represents a radical selected from the group consisting of alkyl and alkenyl radicals containing from 6 to 22 carbon atoms, R' represents a radical selected from the group consisting of alkyl and hydroxyalkyl radicals containing from 1 to 5 carbon atoms, and X represents an anion.

The amounts of cationic surfactant compound, polyisocyanate, and blocking agent used are selected to assure that the resulting carbamate contains at least one thermally stable carbamate group derived from the subject cationic surfactant compounds, at least one thermally labile carbamate group derived from the blocking agent and no free isocyanate groups. This may be accomplished by reacting the polyisocyanate, blocking agent, and cationic surfactant compound in such proportions that the ratio of mols of blocking agent to NCO groups is less than one and the number of NCO groups is equal to or less than the sum of the hydroxyl groups from the cationic surfactant compound and mols of blocking agent. Thus, one mol of the cationic surfactant compound containing two hydroxyl groups and two mols of a diisocyanate may be reacted with two mols of blocking agent whereas one mol of the cationic surfactant compound containing two hydroxyl groups and two mols of triisocyanate may be reacted with four mols of a blocking agent.

The reaction is carried out under conditions which exclude moisture and preferably in the substantial absence of oxygen to minimize the discoloration of the resulting carbamic acid ester. Temperatures up to 200°C. may be used. Preferably, the reaction is carried out at temperatures within the range of about 50°C. to 160°C. The present reaction is generally carried out at atmospheric pressure; however, suitable reduced pressure may be used when indicated. The reaction may be conducted in the absence of a solvent or in the presence of a suitable amount of a solvent which is inert to the isocyanate groups. If a solvent is used, the quantity generally utilized is such to dissolve the reactants. Illustrative examples of such solvents include benzene and 1,1,1-trichloroethane. If desired, a catalytic amount of a catalyst selected from the group consisting of aliphatic tertiary amines, alkali or alkaline earth metal oxides, carbonates, alcoholates, and phenates and metal salts of carboxylic acids may be used to facilitate the reaction. For example, among those that can be used are dimethyl octadecylamine, calcium oxide, and sodium acetate. If a catalyst is used, it should be neutralized after completion of the reaction.

The polyisocyanates which may be used to prepare the carbamic acid ester of this invention are aromatic polyisocyanates; that is, isocyanates containing at least two NCO groups directly attached to carbon atoms of an aromatic ring. Illustrative examples of aromatic polyisocyanates which may be used to prepare the carbamic acid esters of this invention include 2,4-toluene diisocyanate; 2,6-toluene diisocyanate; phenylene diisocyanate; methoxyphenylene 2,4-diisocyanate; diphenylmethane 4,4'-diisocyanate; 3-methyldiphenylmethane 4,4'-diisocyanate; diphenylether 2,4,4'-triisocyanate; and mixtures thereof. The preferred isocyanate is 2,4-toluene diisocyanate.

The cationic surfactant compound used to prepare the subject antistatic agents, as indicated above, is one characterized by the following general formula

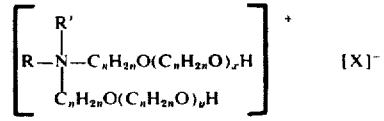

wherein n represents an integer from 2 to 4, x represents a number from 0 to 100, y represents a number from 0 to 100, R represents a radical selected from the group consisting of alkyl and alkenyl radicals containing from 6 to 22 carbon atoms, R' represents a radical selected from the group consisting of alkyl and hydroxyalkyl radicals containing from 1 to 5 carbon atoms, and X represents an anion. A preferred class of cationic surfactants is characterized by the foregoing generalized formula wherein the sum of x and y is a number from 5 to 50. Alkyl and alkenyl radicals represented by R include such typical radicals as hexyl, octyl, nonyl, decyl, dodecyl, stearyl, oleyl, linoleyl, palmityl, behenyl, lionlenyl, and the like. Alkyl radicals represented by R' typically include methyl, ethyl, propyl, isopropyl, n-butyl, isobutyl, sec-butyl, t-butyl, n-amyl, isoamyl, sec-amyl, t-amyl, and other isomeric amyl radicals. Hydroxyalkyl radicals represented by R' are exemplified by hydroxyethyl, hydroxypropyl, hydroxyisopropyl, dihydroxypropyl, hydroxybutyl, dihydroxybutyl, hydroxymethyl, dihydroxyamyl, and the like. Anions typical of those represented by X— are the chloride, bromide, fluoride, iodide, sulfate, sulfonate, phosphate, phosphite, cyanate, isocyanate, sulfite, bisulfite, nitrate, nitrite, oxalate, silicate sulfide, acetate, ethyl sulfate, and other common inorganic and inorganic ions.

Quaternary salts of ethoxylated fatty amines of the kind described above are well known, many are commercially available, and all may be prepared by means of conventional chemical reactions and procedures from primary amines.

Some of the preferred species of the carbamic acid esters of the present invention can be represented by the following generalized formula

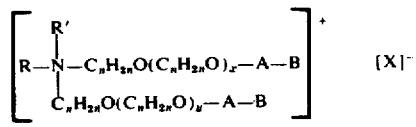

where R' represents a radical selected from the group consisting of alkyl and hydroxyalkyl radicals containing from 1 to 5 carbon atoms, n represents an integer from 2 to 4, x represents a number from 0 to 100, y represents a number from 0 to 100, R represents a radical selected from the group consisting of alkyl and alkenyl radicals containing from 6 to 22 carbon atoms, A represents an organic aromatic polyisocyanate such as disclosed hereinabove, B represents a phenolic thermally reversible blocking agent such as disclosed hereinabove and X represents an anion. Obviously, when R' of the cationic surfactant used as a reactant to prepare the subject carbamic acid ester is hydroxyalkyl, it is also possible to have monophenol-blocked organic polyisocyanates (A—B) also attached at this position.

The present invention is further illustrated by the following examples which include specific embodiments thereof. However, it will be understood that the following examples are set forth solely for the purpose of illustration and should not be interpreted as expressing limitations of the subject invention.

EXAMPLE 1

454 Grams of phenol were refluxed for about 2 hours in 200 ml. of benzene to remove about 3 ml. of water in a Dean-Stark trap. Then the solvent was vacuum stripped at 80°C./0.15 mm Hg until crystals of phenol appeared in the condenser. Vacuum stripping was continued at about 85°C./0.5 mm Hg and then the product was allowed to cool. The vacuum stripped phenol (426.4 grams) was then treated dropwise rapidly at 150°C. with 792 grams 2,4-toluene diisocyanate. Heating was continued for 2 hours at 150°C. Then the product was cooled to give a slightly hazy yellow viscous monophenol-blocked toluene diisocyanate.

125 Grams of the above prepared monophenol-blocked toluene diisocyanate were melted and added with stirring to 250 grams of diethyl sulfate quaternary salt of polyoxyethylene (20) hydrogenated tallow amine under nitrogen gas. Then the mixture was heated to and maintained at about 90°C. for about 3 hours. Then the mixture was cooled to give the desired product which was very viscous and soluble in ethyl alcohol, 1,1,1-trichloroethane, and insoluble in water.

EXAMPLE 2

288 Grams of diethyl sulfate quaternary salt of polyoxyethylene(20) hydrogenated tallow amine and 4.35 grams aqueous sodium hydroxide (to neutralize 90% of the acid in the quaternary salt) were stirred into 300 grams 1,1,1-trichloroethane. The solution was azeotroped to remove water at 77°–81°C. with periodic addition of more 1,1,1-trichloroethane until no more water could be removed. Then the solution was cooled to give a clear red-brown product.

520.8 Grams of the above prepared solution product were stirred and heated at about 75°C. with 116.2 grams of monophenol-blocked 2,4-toluene diisocyanate (as prepared in Example 1) dissolved in 94 ml. of 1,1,1-trichloroethane for 2 hours. Then the resulting solution was vacuum stripped for about 2 hours at 100°C./0.1 mm Hg to give the desired carbamic acid ester product.

EXAMPLE 3

610 Grams of diethyl sulfate quaternary salt of polyoxyethylene(20)hydrogenated tallow amine (neutralized and azeotroped as in Example 2) were treated with 336 grams of monophenol-blocked 2,4-toluene diisocyanate (prepared as in Example 1) dissolved in 165 ml. of 1,1,1-trichloroethane (washed in with 50 ml. more 1,1,1-trichloroethane) at about 54°C. Then the heat was removed while the exothermic reaction proceeded. Then the mixture was allowed to cool and then reheated to reflux over 2 hours. Then the product was cooled to give the desired solution product containing 47.0% solids of a carbamic acid ester of the present invention.

EXAMPLE 4

By a process similar to that of Example 3, 800 grams of diethyl sulfate quaternary salt of polyoxyethylene(20)hydrogenated tallow amine was azeotroped to remove water in toluene instead of in 1,1,1-trichloroethane to give a clear solution.

The water-free quaternary solution was then treated with 340 grams of monophenol-blocked 2,4-toluene diisocyanate in 250 ml. of toluene at 72°C. An exothermic reaction began and the temperature raised to 100°C. over about 15 minutes. The temperature was maintained at 100°C. by heating for 1.5 hours. Then the solution was allowed to cool to give 3000 grams of solution containing 56.25% solids of a carbamic acid ester of the present invention.

EXAMPLE 5

To 3170 grams of diethyl sulfate quaternary salt of polyoxyethylene (20) hydrogenated tallow amine (prepared in toluene as in Example 4) in toluene to give 4784 grams of solution was added 1392 grams of monophenol-blocked 2,4-toluene diisocyanate in 800 ml. of toluene, which was washed in with 200 ml. more of toluene. Then the reaction mixture was heated to and maintained at 80°C. overnight (about 17 hours). The reaction mixture was then cooled to give 7029 grams solution containing 63.68% solids.

The solvent was evaporated from 46.4 grams of the above prepared solution to yield 30.0 grams of the desired carbamic acid ester textile treating product.

The product identified in the above examples as diethyl sulfate quaternary salt of polyoxyethylene(20)hydrogenated tallow amine is principally N,N-polyoxyethylene (20)-N-ethyl-N-stearylammonium ethyl sulfate and was prepared from Armeen HTD hydrogenated tallow amine, which is manufactured by Armour Industrial Chemical Company, Chicago, Illinois.

In accordance with the present invention, carbamic acid esters of the foregoing description may be used to treat textile materials to impart thereto improved physical characteristics, such as antistatic properites. It has been found that if the carbamic acid esters are applied to textile materials and then cured by heating the textile material to an elevated temperature, the carbamic acid esters become attached to the textile material so that the improved properties imparted to the textile material will not be removed by subsequent washing. Although this invention is not limited by theoretical considerations, it is believed that the thermally labile carbamate group of the carbamic acid ester decomposes at elevated temperatures to form an aromatic NCO group and free phenol and that the aromatic NCO group then reacts with the textile material and/or other NCO groups to form thermally stable groups.

The carbamic acid esters of the present invention may be advantageously utilized for application to textile materials alone or in combination with a wide variety of chemical treating agents, among which are included, for example, softening compounds, emulsifying agents, wetting agents, and numerous other compounds that enhance the physical characteristics of the textile materials. The textile material may be treated with the carbamic acid esters of this invention along with any of the wide variety of chemical treating agents listed above, either simultaneously or separately in any order.

The textile treating compositions of this invention may be applied to textile materials from aqueous medium, an organic solvent, or an emulsion of water and an organic solvent. Illustrative examples of organic solvents which may be used include isopropanol, 1,1,1-trichloroethane, 1,1,2-trichloroethane, perchloroethylene, benzene, carbon tetrachloride, chloroform, pentachloroethane, and dichlorobenzene.

Textile materials may be treated with the bath containing a textile treating composition of this invention by any suitable means, such as by immersion therein or by spraying. In the immersion method of application, the textile material may either be run through a padding machine where the textile material is first dipped into the bath and then squeezed, or the textile materials may be dipped into the bath and the excess liquid extracted by centrifugation.

The amount of carbamic acid ester applied to the textile material in accordance with the present invention may vary from about 0.3% to about 10% by weight based on the dry weight of the textile material. However, it has been determined that a more preferred range is from about 0.5% to about 5% by weight based on the dry weight of the textile material in view of the results obtained and cost of material.

It is necessary to subject the textile material having the carbamic acid ester thereon to an elevated temperature in order to initiate the curing reaction between the carbamic acid ester and the textile material. The particular temperature used and the duration of the heating step depends upon the nature of the textile material being treated and on the particular carbamic acid ester used. In each situation, however, the temperature and heating time are those necessary to sufficiently cause reaction of the carbamic acid ester with the textile material. Generally, the heat cure may be affected at temperatures from about 100°F. and about 350°F. and in periods of time ranging from about 40 to about 60 minutes at the lower temperature to about 0.5 to about 10 minutes at the higher temperature. The preferred temperature is from about 300°F. to 350°F.

Textile materials which may be treated with the textile composition of this invention include any textile material conventionally treated with antistatic agents; for example, textile materials comprised of nylon and polyesters and blends of such synthetic fibers with other cellulosic and noncellulosic materials such as acrylics, rayon, cotton, linen, and mixtures thereof. The textile materials that can be treated in accordance with the present invention may be in the form of filaments, fibers, threads and yarns, or in the form of woven, nonwoven, knit, or otherwise formed fabrics, sheets, and cloths.

The following examples will illustrate to one skilled in the present art the application of the subject textile treating compositions to textile materials. All parts and percentages are by weight unless otherwise indicated.

EXAMPLE 6

A solution of 3 grams of the product of Example 1 and 3 grams of 1,1,1-trichloroethane was prepared and then dispersed in 294 grams of water having a temperature of about 72°F. Fifteen inch by fifteen inch pieces of spun polyester fabric were then padded with the above prepared solution on a Butterworth pad using a double dip, double nip technique. The polyester fabric had a 67% wet pickup. Then the treated polyester fabric was allowed to dry overnight at room temperature of about 72°F. Following this drying cycle, the treated polyester fabric was then cured in a hot air oven for 8 minutes at about 300°F.

Electrical resistivity tests of the fabrics were then made before washing after being conditioned overnight at 40 % relative humidity at 75°F. and after 1, 5, and 10 washings after being conditioned overnight at 40% relative humidity at about 75°F.

The test results obtained are set forth in the following table wherein the Log R is a measure of the resistance of the fabric being tested. Log R values within the range of from about 10 to 13 are thought to indicate that the fabric possesses significant antistatic properties. The washing of the fabrics in the above examples was accomplished with the use of a Kenmore washer, Model 600, with a 12 minute wash cycle using the commercial detergent Tide followed by 2 rinses and a spin cycle. Following the above described wash procedure, the test fabrics were then dried in a Kenmore dryer for 20 minutes.

The above prepared treated fabrics were washed 0, 1, 5, and 10 times according to the above described procedure and were determined to have the following Log R values:

| Number of Washes | 0 | 1 | 5 | 10 |
|---|---|---|---|---|
| Log R Values | 10.29 | 12.10 | 12.44 | 12.52 |

The Log R values given in the above example and following examples were determined with the use of the Beckman Ultrohmeter using 1 by 3 inch samples of the treated fabric. Three pieces of each fabric were tested and the Log R values given in the examples are the average of these 3 test samples.

EXAMPLE 7

Four and a half grams of the product of Example 1 were dissolved in 4½ grams of 1,1,1-trichloroethane and then the resulting solution was dispersed in 291 grams of water at about 72°F. Then 15 inch by 15 inch pieces of spun polyester fabric were padded as in Example 6 followed by a drying cycle of 3 minutes at 225°F. in a forced air oven and a curing cycle of 3 minutes at about 325°F. The pieces of polyester fabric were then washed, conditioned, and tested as in Example 6 and the results obtained are as follows:

| Number of Washes | 0 | 1 | 5 | 10 |
|---|---|---|---|---|
| Log R Values | 10.81 | 12.61 | 12.83 | 12.84 |

EXAMPLE 8

19.2 Grams of a 50% solution of the product of Example 1 in 1,1,1-trichloroethane were placed in 280.8 grams of 1,1,1-trichloroethane. Then using a Butterworth pad, 15 inch by 15 inch pieces of spun polyester fabric were padded to a 100% wet pickup using a double dip, double nip technique. In this instance the treated polyester fabric was not dried but was immediately cured for 5 minutes at 300°F. The cured pieces of fabric were then washed, conditioned, and tested as were the fabrics in Example 6; and the results obtained are as follows:

| Number of Washes | 0 | 1 | 5 | 10 |
|---|---|---|---|---|
| Log R Values | 11.63 | 11.09 | 11.59 | 12.59 |

EXAMPLE 9

30 Grams of a 50% solution of the product of Example 1 in 1,1,1-trichloroethane were placed in 270 grams of 1,1,1-trichloroethane. Then 15 inch by 15 inch pieces of nylon taffeta were placed to a 50% wet pickup on the Butterworth pad using a double dip, double nip technique. The pieces of treated nylon taffeta were then line dried at room temperature overnight followed by a curing for 5 minutes at about 350°F. The treated samples of nylon taffeta were then washed, conditioned, and tested as outlined in Example 6. The results obtained are as follows:

| Number of Washes | 0 | 1 | 5 |
|---|---|---|---|
| Log R Values | 9.85 | 11.79 | 11.64 |

EXAMPLE 10

19.2 Grams of a 50% solution of the product of Example 1 in 1,1,1-trichloroethane were placed in 281.8 grams at 1,1,1-trichloroethane. Pieces of nylon taffeta were padded as in Example 9 and line dried overnight at room temperature followed by a curing of 5 minutes at about 300°F. The treated fabric was then washed, conditioned, and tested as was carried out in Example 6. The Log R values obtained were as follows:

| Number of Washes | 0 | 1 | 5 |
|---|---|---|---|
| Log R Values | 11.34 | 11.17 | 11.69 |

Having thus described my invention, I claim:

1. A composition consisting essentially of the reaction product of (a) an organic aromatic polyisocyanate containing at least 2 NCO groups directly attached to the carbon atoms of an aromatic ring, (b) a thermally reversible blocking agent selected from the group consisting of phenol, lower alkyl substituted phenols, and mixtures thereof, and (c) a cationic surfactant represented by the formula

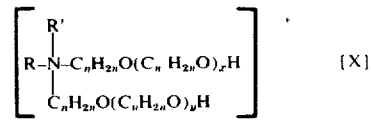

wherein $n$ represents an integer from 2 to 4, $x$ represents a number from 0 to 100, $y$ represents a number from 0 to 100, R represents a radical selected from the group consisting of alkyl and alkenyl radicals containing from 6 to 22 carbon atoms, R' represents a radical selected from the group consisting of alkyl and hydroxyalkyl radicals containing from 1 to 5 carbon atoms, and X represents an anion said reaction being carried out at a temperature up to 200°C. and the amounts of organic aromatic polyisocyanate, thermally reversible blocking agent, and cationic surfactant are selected to furnish a ratio of mols of blocking agent to NCO groups present in the aromatic polyisocyanate of less than 1 and a number of NCO groups of not more than the sum of the hydroxyl groups of the cationic surfactant and mols of blocking agent.

2. A composition of claim 1 wherein the thermally reversible blocking agent is selected from the group consisting of phenol, methylphenol, dimethylphenol, trimethylphenol, ethylphenol, and mixtures thereof.

3. A composition of claim 1 wherein the aromatic polyisocyanate selected from the group consisting of 2,4-toluene diisocyanate; 2,6-toluene diisocyanate; phenylene diisocyanate; methoxyphenylene 2,4-diisocyanate; diphenyl methane 4,4'-diisocyanate; 3-methyl-diphenyl methane 4,4'-diisocyanate; diphenyl ether 2,4,4'-triisocyanate; and mixtures thereof.

4. A composition of claim 1 wherein the sum of $x$ and $y$ in the formula for the said cationic surfactant is a number from 5 to 50.

5. A composition of claim 3 wherein the sum of $x$ and $y$ for the said cationic surfactant is from 5 to 50.

6. A composition of claim 1 wherein the cationic surfactant is diethyl sulfate quaternary salt of polyoxyethylene(20)hydrogenated tallow amine.

7. A composition of claim 1 wherein (a) is 2,4-toluene diisocyanate, (b) is phenol, (c) is diethyl sulfate quaternary salt of polyoxyethylene(20)hydrogenated tallow amine.

* * * * *